United States Patent [19]

Kim

[11] Patent Number: 5,712,773
[45] Date of Patent: Jan. 27, 1998

[54] GAS TUBE SIGN POWER SUPPLY

[76] Inventor: Hyung-Kwang Kim, Room 502, 2th Dong Yar-Su Apartment, Sang Do 4-Dong, Dong-Chak Ku Seoul, Rep. of Korea

[21] Appl. No.: 730,449

[22] Filed: Oct. 15, 1996

[30] Foreign Application Priority Data

Oct. 13, 1995 [KR] Rep. of Korea ............... 35282/1995

[51] Int. Cl.[6] .................................................. H02M 5/45
[52] U.S. Cl. .................................. 363/37; 363/50
[58] Field of Search ................... 363/17, 20, 21, 363/24, 25, 34, 37, 50, 52, 53, 55, 56, 67, 69

[56] References Cited

U.S. PATENT DOCUMENTS

| | | | |
|---|---|---|---|
| 4,839,915 | 6/1989 | Kaneko et al. | 363/17 |
| 4,903,183 | 2/1990 | Noguchi et al. | 363/21 |
| 5,227,964 | 7/1993 | Furuhata | 363/56 |
| 5,631,814 | 5/1997 | Zak | 363/37 |
| 5,633,787 | 5/1997 | Song | 363/21 |

Primary Examiner—Peter S. Wong
Assistant Examiner—Y. J. Han
Attorney, Agent, or Firm—Robert E. Bushnell, Esq.

[57] ABSTRACT

A power supply apparatus for a gas tube including: a first rectifying portion for bridge-rectifying an alternating current input thereto into a direct current, a second rectifying portion for bridge-rectifying the output voltage of the first rectifying portion into a direct current again, a switching means for receiving stable power from the second rectifying portion and for controlling the operation of a high voltage transformer driving portion, an oscillating frequency and duty cycle ratio controller for controlling the oscillating frequency and duty cycle ratio of the switching means, the high voltage transformer driving portion selectively interrupting a flow of current of the high voltage transformer in accordance with the output of the switching means, and a high voltage output preventing portion for halting the operation of the frequency oscillation and duty cycle ratio controller by being turned on when a secondary side center tap voltage of the high voltage transformer is detected to be beyond a particular voltage. Water drop formation on the surface of the neon tube and also the blackening phenomenon of the argon tube are prevented by controlling the oscillation frequency and duty cycle ratio in a gas-tube power supply apparatus for a neon tube or an argon tube.

6 Claims, 4 Drawing Sheets

5,712,773

1

GAS TUBE SIGN POWER SUPPLY

CLAIM OF PRIORITY

This application makes reference to, and claims all benefits accruing under 35 U.S.C. §119 from an application for *Power Supplying Apparatus For Gas Tube* earlier filed in the Korean Industrial Property Office on 13 Oct. 1995 and there duly assigned Ser. No. 35282/19952 the same being attached hereto.

BACKGROUND OF THE INVENTION

1. Field of the Invention

The present invention relates to a power supply apparatus for a gas robe sign in which the oscillation frequency and duty cycle ratio in a gas-robe power supply apparatus for a neon robe or an argon tube can be controlled so that water drop formation inside the neon tube and a blackening phenomenon on the argon tube are prevented. In other words, the present invention is an astable multivibrator with a fixed pulse repetition frequency and an adjustable duty cycle circuit. The duty cycle can be varied over 10–90%, and the astable circuit operates with a pulse repetition frequency of 23 Khz±2%.

2. Description of the Related Art

In a conventional power supply apparatus for a gas tube sign, power consumption increases due to a large amount of leakage current of a transformer and an electric shock or danger of fire occurs due to corona discharge during no load or shorts. Also, the following problems are caused in manufacturing an electronic neon transformer of a high voltage and high frequency type. First, when the electronic neon transformer is employed for a neon tube, a phenomenon occurs in which pea-shaped drops of water flow on a surface of the neon tube. Second, when the electronic neon transformer is employed for a argon tube, the inside surface of the argon tube gradually blackens to thereby reduce the life span of the tube.

SUMMARY OF THE INVENTION

To overcome the above problems, it is an object of the present invention to provide a power supply apparatus for a gas tube sign which prevents water drop formation on the surface of the tube by controlling the oscillation frequency and duty cycle ratio in a gas-tube power supply apparatus for a neon tube.

It is another object of the present invention to provide a power supply apparatus for a gas tube sign which prevents a blackening on a surface of an argon tube by serially oscillating by using a high voltage transformer and capacitors.

It is yet another object of the present invention to provide a power supply apparatus for a gas tube sign which provides reliability of circuit operation and simplifies the structure thereof by using a feed back structure to stabilize a FET output signal without using a transformer for driving the FET for a high voltage transformer driving use.

Accordingly, there is provided a power supply apparatus for a gas tube sign including a first rectifying portion for bridge-rectifying alternating current input thereto, a second rectifying portion for bridge-rectifying the output voltage of the fast rectifying portion, a switching means for receiving stable power from the second rectifying portion and for controlling the operation of a high voltage transformer driving portion, an oscillating frequency and duty cycle ratio controller for controlling the oscillating frequency and duty cycle ratio of the switching means, the high voltage transformer driving portion for selectively interrupting a flow of current of a high voltage transformer in accordance with the output of the switching means, and a high voltage output preventing portion for halting the operation of the oscillating frequency and duty cycle ratio controller by being turned on when a secondary side center tap voltage of the high voltage transformer is detected to be beyond a particular voltage.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

First Embodiment

Figure 1:
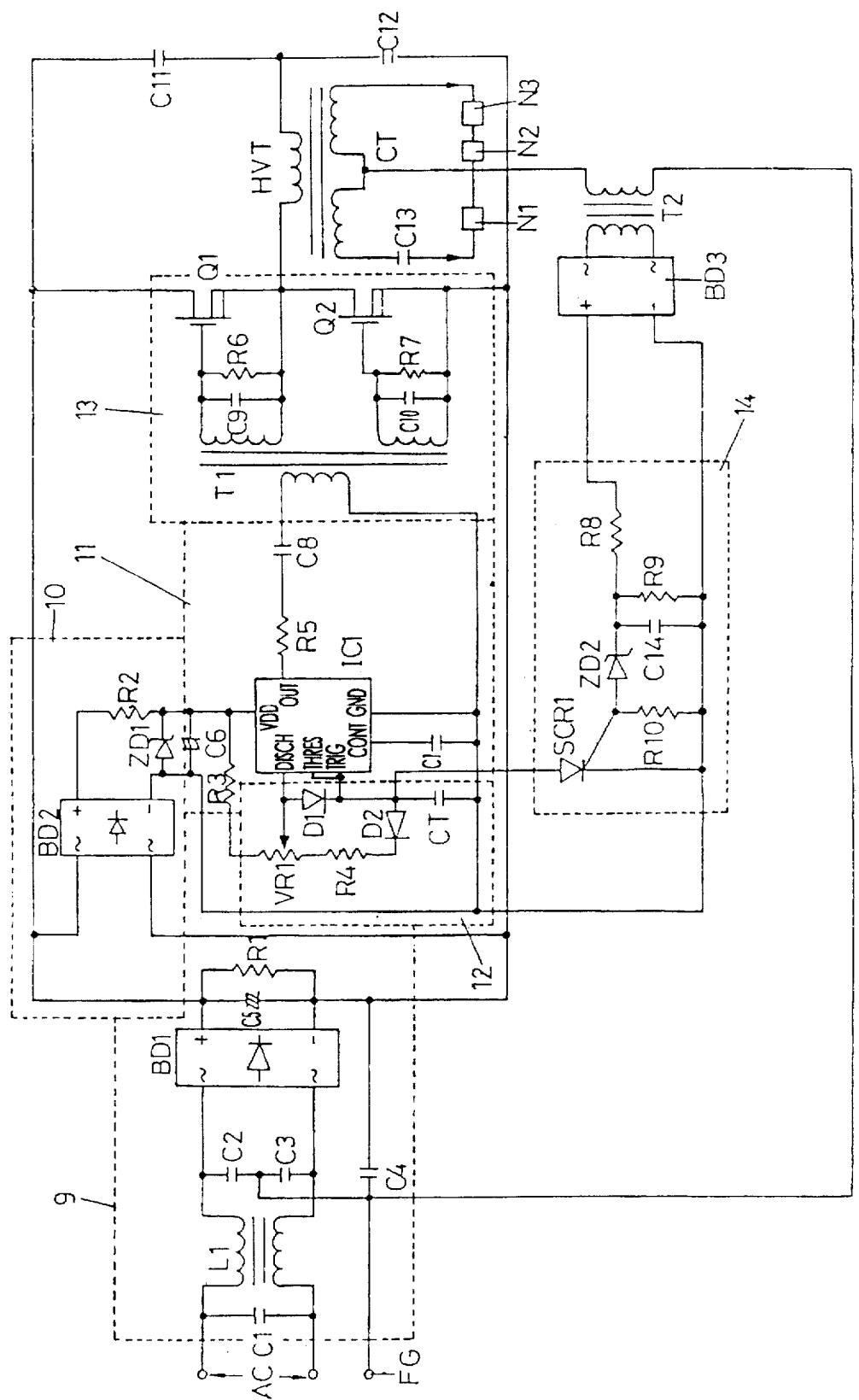
FIG. 1 is a circuit diagram illustrating a structure of a first preferred embodiment of a power supply apparatus according to the present invention.

Referring to FIG. 1, a power supply apparatus according to a first preferred embodiment of the present invention is comprised of a first rectifying portion 9 for bridge-rectifying an AC (alternating current) input into DC (direct current), a second rectifying portion 10 for bridge-rectifying the output voltage of the first rectifying portion 9, a switch 11 for receiving stable power from the second rectifying portion 10 and for controlling the operation of a high voltage transformer (HVT) driving portion 13 described later, an oscillating frequency and duty cycle ratio controller 12 for controlling the oscillating frequency and duty cycle ratio of the switch 11, the high voltage transformer driving portion 13 selectively interrupting a flow of current of the HVT in accordance with the output of the switch 11, and a high voltage output preventing portion 14 for halting the operation of the frequency oscillating and duty cycle ratio controller 12 by being turned on when a secondary side center tap voltage of the HVT is detected to be beyond a predetermined voltage, e.g., a high voltage.

Figure 2:
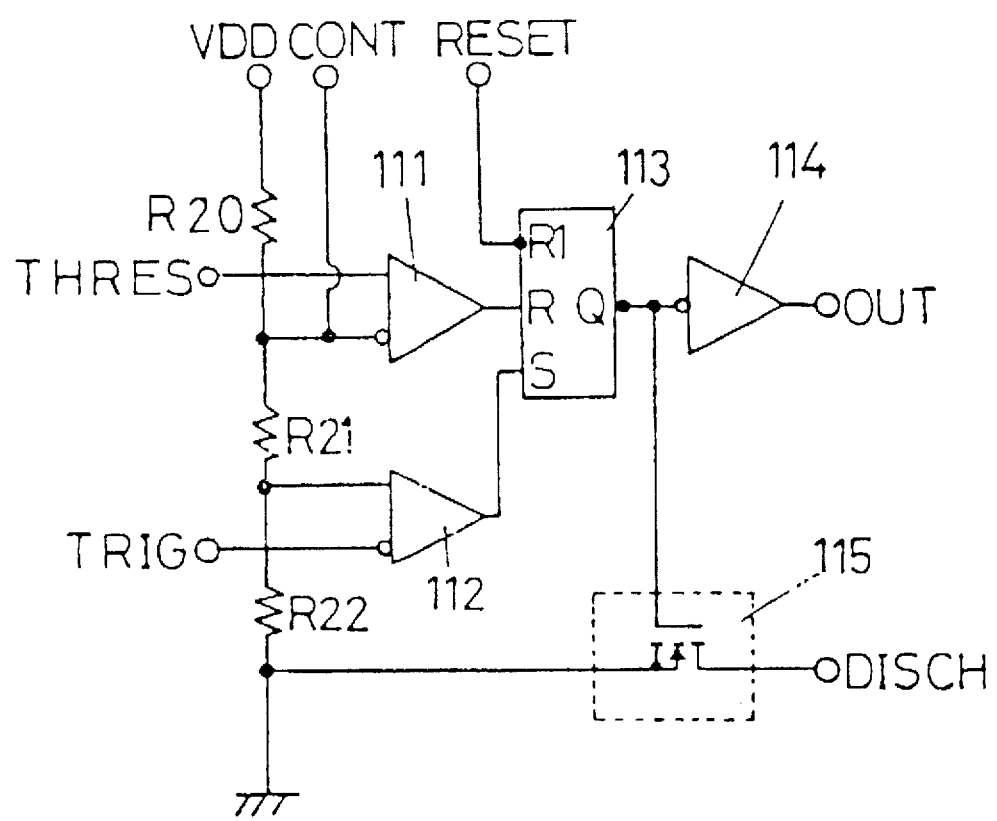
FIG. 2 is a detailed circuit diagram illustrating a switching IC according to the present invention.

Referring to FIG. 2, a switching IC is comprised of comparators 111 and 112 for comparing threshold (THRES) and trigger (TRIG) port voltages with a reference voltage VDD, and an R–S flip-flop 113 for receiving the outputs of the comparators 111 and 112 through input ports R and S and for providing an output to a buffer 114 and a field effect transistor (FET) 115.

In the power supply apparatus having such a structure according to the first embodiment of the present invention, when AC is applied and a predetermined AC is generated via transformer $L_1$, the AC is rectified and smoothed into DC via a first bridge diode $BD_1$, a resistor $R_1$ and a capacitor $C_5$. The DC becomes stable after passing through a second bridge diode $BD_2$, a zener diode $ZD_1$ and a capacitor $C_6$ in the second rectifying portion 10 and is applied to the VDD input of the switching IC $IC_1$. The switching IC $IC_1$ operates and the VDD is distributed as shown in FIG. 2. The voltage distributed via distribution resistors $R_{20}-R_{22}$ and the voltage input from the THRES and TRIG ports are compared by the comparators 111 and 112 and a second voltage is input to the set and reset ports R and S of the R–S flip-flop 113. The signal output from an output port Q of the R–S flip-flop 113 is amplified after passing through the buffer 114 and applied to a primary side of the transformer $T_1$ via an output port OUT.

The +B power going to switching portions Q1 and Q2 from the BD1 of first rectifying portion 9 is high and the power supplied to the swithcing IC is whthin 18 VDC. Therefore, in order to overcome the problem casued due to the potential difference between the high and low voltages, the high-level GND potential and the low-level GND potential are completely separated. The first rectifying portion 9 is designed to supply a high-level DC voltage, and the second rectifying portion 10 is to supply a low-level DC voltage.

The signal passing through FET 115 is supplied to a variable resistor $VR_1$ and a diode $D_1$. The resistors $VR_1$ and $R_4$ are for adjusting the oscillation frequency and duty cycle ratio and a capacitor CT connected to the diode $D_1$ is for adjusting the oscillation frequency. A capacitor $C_7$ connected to a constant port (CONT) is for determining a threshold level.

The FETs $Q_1$ and $Q_2$ connected to the secondary side of the transformer T selectively interrupt current flowing in the transformer HVT by alternately being mined on or off.

A plurality of neon tubes or argon tubes $N_1-N_3$ connected to the secondary side of the transformer HVT are mined on and off according to the state of the current flowing in the primary side of the transformer HVT. A high voltage output is detected by the transformer $T_2$ connected to the secondary side center tap CT of the transformer HVT. When the detected voltage is beyond a particular level (a set voltage of a zener diode $ZD_2$) at the secondary side of the transformer $T_2$, the zener diode $ZD_2$ turns on. Accordingly, a silicon controlled rectifying device $SCR_1$ is mined on and the operation of the oscillating frequency and duty cycle controller 12 is stopped.

Second Embodiment

Figure 3:
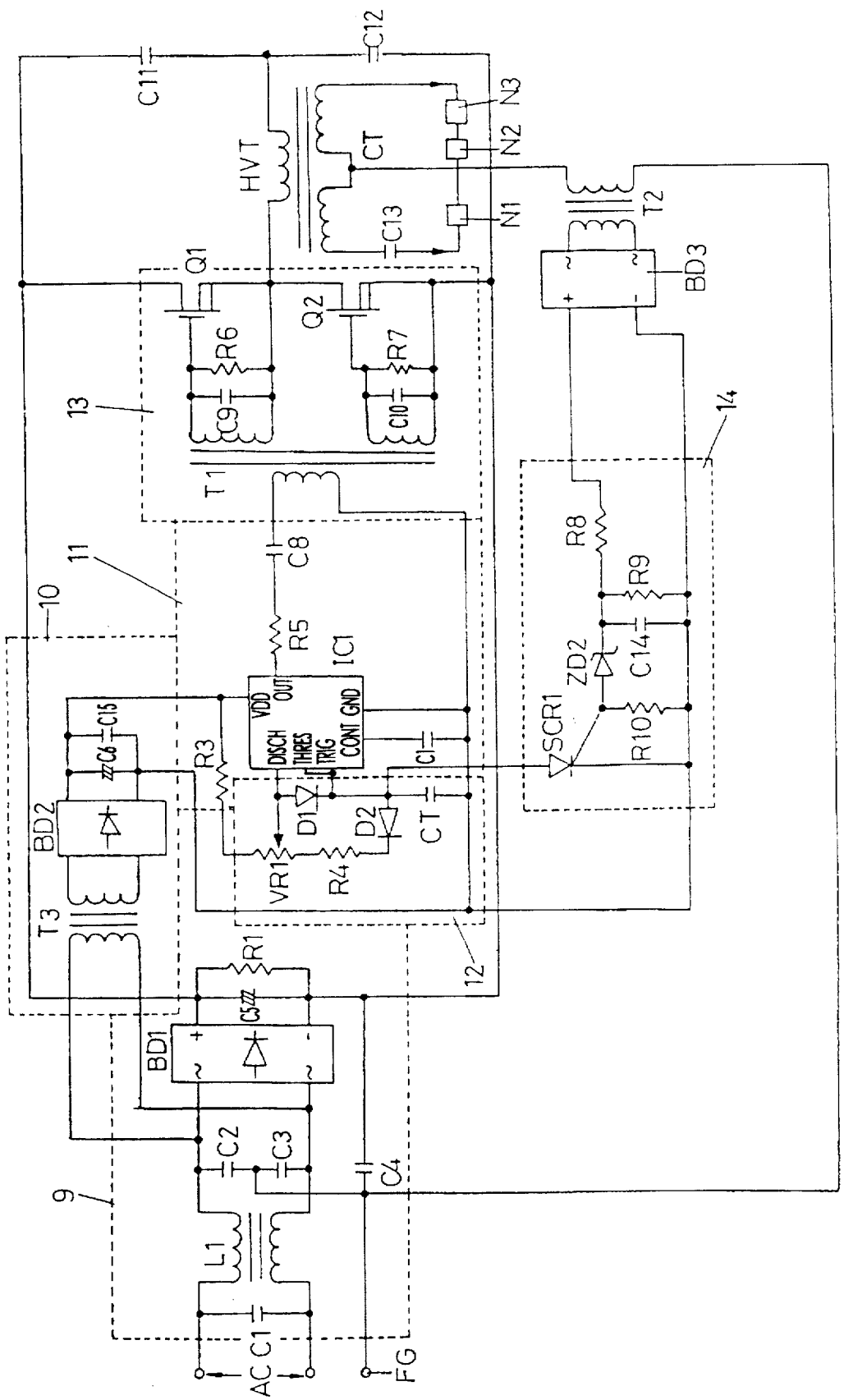
FIG. 3 is a circuit diagram illustrating a structure of a second preferred embodiment of a power supply apparatus according to the present invention.

In FIG. 3, the structure of the second rectifying portion 10 is different from that of the second rectifying portion 10 shown in FIG. 1, namely, a transformer $T_3$ is connected to the secondary side of the transformer $L_1$ of the first rectifying portion 9 and the second bridge diode $B_2D$ and the capacitors $C_6$ and $C_{15}$ are connected to the secondary side of the transformer $T_3$.

In FIG. 3, the second rectifying portion 10 is comprised of the transformer $T_3$, the second bridge diode $BD_2$ and the capacitors $C_6$ and $C_{15}$ and the operation thereof is the same as that of FIG. 1.

The second rectifying portion 10 of FIG. 1 outputs a stabilized DC voltage by a zener diode ED1. The second rectifying portion 10 of FIG. 3 uses transformer $T_3$ instead of the zener diode. For this reason, although the output of transformer $L_1$ of the first rectifying portion is unstable, the voltage is transformed by the transformer $T_3$ of the second rectifying portion 10 so that it is stabilized. Accordingly, the second rectifying portion of FIG. 3 outputs a stabilized DC voltage, like the second rectifying portion 10 of FIG. 1, even without the zener diode.

Third Embodiment

Figure 4:
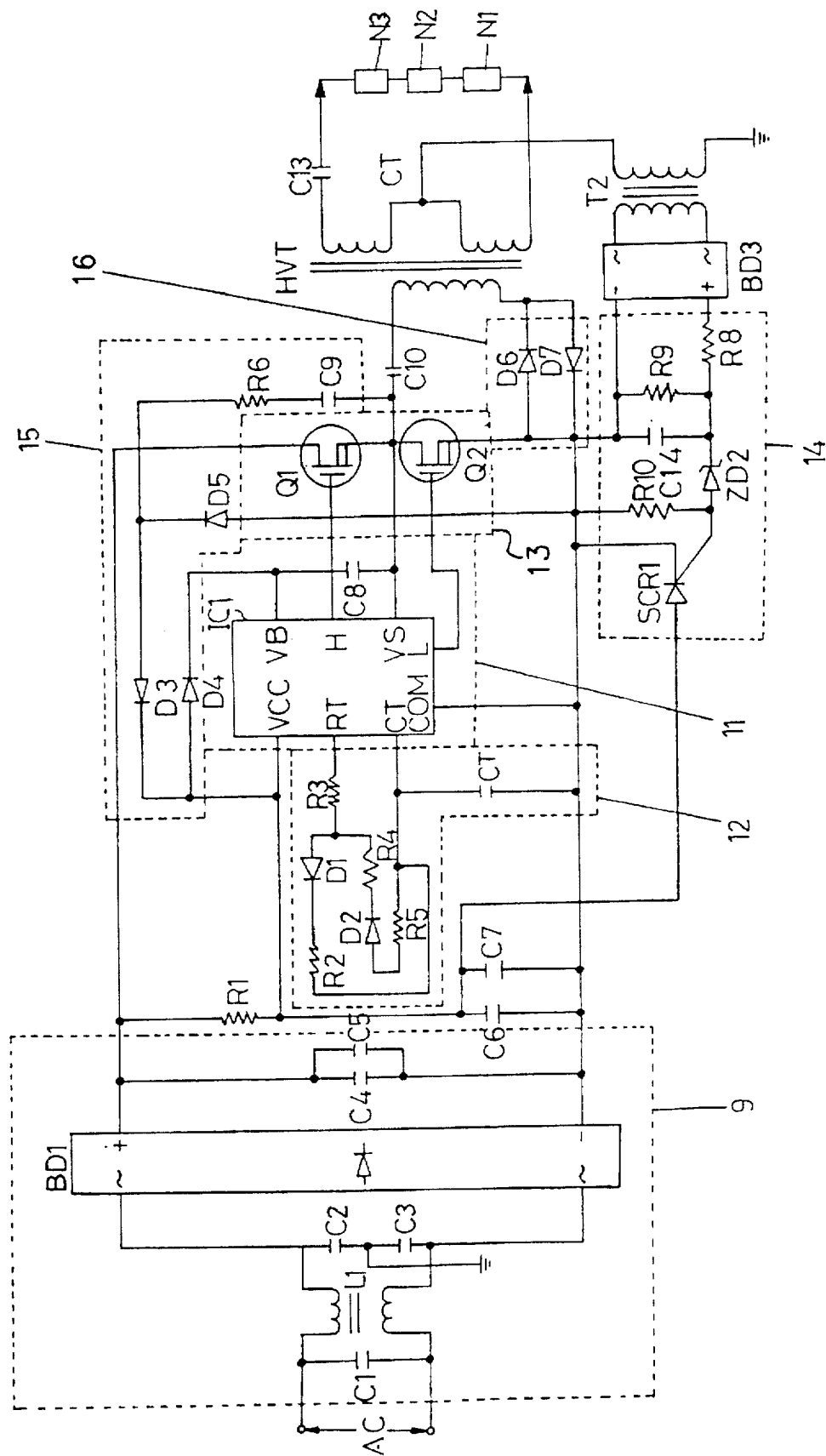
FIG. 4 is a circuit diagram illustrating a structure of a third preferred embodiment of a power supply apparatus according to the present invention.

In FIG. 4, an output safe returning portion 15 constituted by diodes $D_3-D_5$, resistor $R_6$ and a capacitor $C_9$ is connected between the output port of the high transformer driving portion 13 and the switching portion 11. A current detecting portion 16 constituted by diodes $D_6$ and $D_7$ is connected to one end of the primary side of the transformer HVT and one end of the first bridge diode $BD_1$.

In FIG. 4, the output is stabilized by feeding back the output signal of the FETs $Q_1$ and $Q_2$ to the terminal, $V_{CC}$ and $V_B$ of the switching IC $IC_1$ via the resistor $R_6$, capacitor $C_9$, and the diodes $D_3$ and $D_4$. The switching IC of FIG. 4 is almost the same as that of a Times 555, which is controlled by the oscillating frequency and the RC constant of the duty cycle ratio controller.

Also, the current detecting portion 16 for detecting the mount of current flowing in the primary side of the transformer HVT is provided so that operational stabilization of the high voltage output preventing portion 14 is achieved and simultaneously the circuit is simplified since the transformer $T_1$ is not needed in the high voltage transformer driving portion 13. When the trouble of the high-power output portion is sensed so that overcurrent flows therethrough, the current detecting portion detects it. If the overcurrent flow is sensed, the output stable feedback portion temporarily holds the charges, preventing accidents due to the trouble.

As described above, the present invention prevents water drop formation on the surface of the neon tube and also the blackening phenomenon of the argon tube by controlling the oscillation frequency and duty cycle ratio in a gas-tube power supply apparatus for a neon tube or an argon tube. Therefore, reliability and extension of life span of products are provided and cost can be saved due to the simplified circuit structure.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A power supply apparatus comprising:
    a first rectifying portion for bridge-rectifying an alternating current input thereto;
    a second rectifying portion for bridge-rectifying an output voltage of said first rectifying portion;
    a high voltage transformer driving portion for driving a high voltage transformer;
    a switching means for receiving stable power from said second rectifying portion and for controlling the operation of said high voltage transformer driving portion;
    an oscillating frequency and duty cycle ratio controller for controlling an oscillating frequency and duty cycle ratio of said switching means;
    said high voltage transformer driving portion selectively interrupting a flow of current of said high voltage transformer in accordance with the output of said switching means; and
    a high voltage output preventing portion for halting the operation of said oscillating frequency and duty cycle ratio controller by being turned on when a secondary side center tap voltage of said high voltage transformer is greater than a predetermined voltage.

2. A power supply apparatus comprising:
    a first rectifying portion for bridge-rectifying an alternating current input thereto, said first rectifying portion comprising a transformer connected to a bridge-rectifier connected to a smoothing capacitor;

a second rectifying portion, connected to an output of said first rectifying portion, for bridge-rectifying an output voltage of said first rectifying portion, said second rectifying portion comprising another bridge-rectifier connected to a resistor connected to a parallel combination of a Zener diode and another smoothing capacitor;

a high voltage transformer driving portion for driving a high voltage transformer, said high voltage transformer driving portion comprising a transformer driving a pair of push-pull connected Field Effect Transistors;

a switching means for receiving stable power from said second rectifying portion and for controlling the operation of said high voltage transformer driving portion;

an oscillating frequency and duty cycle ratio controller for controller an oscillating frequency and duty cycle ratio of said switching means, said oscillating frequency and duty cycle ratio controller comprising a pair of diodes and a capacitor and a series connected string consisting of two fixed resistors and a variable resistor;

said high voltage transformer driving portion selectively interrupting a flow of current of said high voltage transformer in accordance with the output of said switching means; and a high voltage output preventing portion for halting the operation of said oscillating frequency and duty cycle ratio controller by being turned on when a secondary side center tap voltage of said high voltage transformer is greater than a predetermined voltage, said high voltage output preventing portion comprising resistors and a capacitor and another Zener diode driving a Silicon Control Rectifier.

3. A power supply apparatus comprising:

a first rectifying portion for bridge-rectifying an alternating current input thereto, said first rectifying portion comprising a transformer connected to a bridge-rectifier connected to a smoothing capacitor;

a second rectifying portion, connected to an output of said transformer of said first rectifying portion, for bridge-rectifying an output voltage of said transformer of said first rectifying portion, said second rectifying portion comprising another transformer driving another bridge-rectifier and including another smoothing capacitor connected across an output of said another bridge-rectifier;

a high voltage transformer driving portion for driving a high voltage transformer, said high voltage transformer driving portion comprising a transformer driving a pair of push-pull connected Field Effect Transistors;

a switching means for receiving stable power from said second rectifying portion and for controlling the operation of said high voltage transformer driving portion;

an oscillating frequency and duty cycle ratio controller for controller an oscillating frequency and duty cycle ratio of said switching means, said oscillating frequency and duty cycle ratio controller comprising a pair of diodes and a capacitor and a series connected string consisting of two fixed resistors and a variable resistor;

said high voltage transformer driving portion selectively interrupting a flow of current of said high voltage transformer in accordance with the output of said switching means; and a high voltage output preventing portion for halting the operation of said oscillating frequency and duty cycle ratio controller by being mined on when a secondary side center tap voltage of said high voltage transformer is greater than a predetermined voltage, said high voltage output preventing portion comprising resistors and a capacitor and another Zener diode driving a Silicon Control Rectifier.

4. A power supply apparatus comprising:

a first rectifying portion for bridge-rectifying an alternating current input thereto;

a high voltage transformer driving portion for driving a high voltage transformer;

a switching means for receiving stable power from said first rectifying portion and for controlling the operation of said high voltage transformer driving portion;

an oscillating frequency and duty cycle ratio controller for controlling the oscillating frequency and duty cycle ratio of said switching means;

said high voltage transformer driving portion selectively interrupting a flow of current of said high voltage transformer in accordance with the output of said switching means; and a high voltage output preventing portion for halting the operation of said oscillating frequency and duty cycle ratio controller by being turned on when a secondary side center tap voltage of said high voltage transformer is greater than a predetermined voltage.

5. A power supply apparatus as claimed in claim 4, further comprising an output safe returning portion, comprising diodes, a resistor and a capacitor, connected between an output port of said high voltage transformer driving portion and said switching means.

6. A power supply apparatus as claimed in claim 4, wherein a current detecting portion, comprising diodes, is connected between one terminal of a primary side of said high voltage transformer and one terminal of said first bridge diode.

* * * * *